United States Patent [19]

Garnier et al.

[11] Patent Number: 5,256,180
[45] Date of Patent: Oct. 26, 1993

[54] APPARATUS FOR PRODUCTION OF HOLLOW GLASS MICROSPHERES

[75] Inventors: Patrick Garnier, Paris; Daniel Abriou, Gagny, both of France; Jean-Jacques Gaudiot, Sao Paolo, Brazil

[73] Assignee: Saint Gobain Vitrage, Courbevoie, France

[21] Appl. No.: 12,966

[22] Filed: Jan. 29, 1993

Related U.S. Application Data

[60] Continuation of Ser. No. 737,567, Jul. 26, 1991, abandoned, which is a division of Ser. No. 220,131, Jul. 18, 1988, abandoned, which is a division of Ser. No. 20,800, Mar. 2, 1987, Pat. No. 4,778,502, which is a continuation-in-part of Ser. No. 747,141, Jun. 20, 1985, Pat. No. 4,661,137.

[30] Foreign Application Priority Data

Jun. 21, 1984 [FR] France ............... 84 09736
Mar. 3, 1986 [FR] France ............... 86 02929

[51] Int. Cl.$^5$ .............................. C03B 19/10
[52] U.S. Cl. ............................ 65/142; 65/21.4; 65/22
[58] Field of Search .................. 65/142, 21.4, 22

[56] References Cited

U.S. PATENT DOCUMENTS

| | | | |
|---|---|---|---|
| 2,221,709 | 11/1940 | Hood et al. | 106/36.1 |
| 2,911,669 | 11/1959 | Beckwith | 65/21.4 |
| 2,947,115 | 8/1960 | Wood | 65/142 |
| 3,061,495 | 10/1962 | Alford | 156/25 |
| 3,230,064 | 1/1966 | Veatch et al. | 65/142 |
| 3,323,888 | 6/1967 | Searight et al. | 65/142 X |
| 3,365,315 | 1/1968 | Beck | 106/40 |
| 3,458,332 | 7/1969 | Alford et al. | 501/33 |
| 3,495,961 | 2/1970 | Lange | 65/142 X |
| 3,573,018 | 3/1971 | Nesbitt et al. | 65/142 X |
| 3,597,176 | 8/1971 | Plumat | 65/142 X |
| 3,656,921 | 4/1972 | Willcox | 428/406 X |
| 3,838,998 | 10/1974 | Matthews et al. | 65/21.4 |
| 4,017,290 | 4/1977 | Budrick et al. | 65/21.4 |
| 4,059,423 | 11/1977 | DeVos et al. | 65/21 |
| 4,391,646 | 7/1983 | Howell | 501/33 X |
| 4,459,145 | 7/1984 | Elsholz | 65/21.3 |
| 4,475,936 | 10/1984 | Aston et al. | 65/21.4 |
| 4,487,620 | 12/1984 | Neusy | 65/21.3 |
| 4,542,066 | 9/1985 | Delzant | 428/406 |
| 4,547,233 | 10/1985 | Delzant | 149/2 |

FOREIGN PATENT DOCUMENTS

| | | |
|---|---|---|
| 2249585 | 5/1975 | France . |
| 2318123 | 2/1977 | France . |
| 2524610 | 11/1983 | France . |
| 2529879 | 1/1984 | France . |
| 49-37565 | 10/1974 | Japan . |
| 1076224 | 7/1967 | United Kingdom . |
| 960902 | 6/1984 | United Kingdom . |

OTHER PUBLICATIONS

Chopinet et al, Factors Determining the Residual Sulfate Content of Glass; Glasstechniche Berichte vol. 56, pp. 596-601 (1983).
Glass Microballoon Particles for Construction Materials, Alford, Ceramic Age, Apr. 1967, pp. 55, 56 & 58.

*Primary Examiner*—Robert L. Lindsay
*Attorney, Agent, or Firm*—Pennie & Edmonds

[57] ABSTRACT

Processes and apparatus for the production of hollow microspheres by thermal expansion of glass particles including the thermal treatment of extremely small glass particles whose dimensions are less than 50 micrometers and, preferably, less than 35 micrometers or even 20 micrometers, which include a fluidizing agent. This technique makes possible the production of extremely small glass microspheres under satisfactory yield conditions. Also, the hollow microsphere products produced by these processes and apparatus.

15 Claims, 2 Drawing Sheets

APPARATUS FOR PRODUCTION OF HOLLOW GLASS MICROSPHERES

This application is a continuation of 07/737,567 filed Jul. 26, 1991 abandoned, which is a division of 07/220,131, filed Jul. 18, 1988abandoned, which is a division of 07/020,800, filed Mar. 2,1987, now U.S. Pat. No. 4,778,502, which is a continuation-in-part of 06/747,141, filed Jun. 20, 1985, now U.S. Pat. No. 4,661,132.

TECHNICAL FIELD

The invention relates to the techniques of production of glass hollow microspheres. More precisely, the invention concerns the techniques in which fine glass particles are expanded by a thermal treatment to form fine hollow microspheres. The invention also relates to the hollow microsphere products themselves as well as to apparatus for their production.

DESCRIPTION OF THE INVENTION

Of the more recent publications on this subject, U.S. Pat. No. 4,661,137 describes in a very detailed manner a set of conditions which make it possible to attain interesting results in the production of hollow glass microspheres. In particular, this publication specifies the best process conditions of temperature, treatment, time, etc., which result in satisfactory expansion yields. Unless otherwise indicated, the teaching of this prior application is applicable in the case of the present invention, and is expressly incorporated herein by reference.

Among other advantages of the mode of expansion according to these techniques, it appears that it is possible to treat particles whose initial dimensions are very small in comparison with those that could be treated previously. A reason advanced in support of this finding is linked to the shortness of treatment under the process conditions described in that patent. Be that as it may, it seemed on this occasion that it was possible to treat glass particles having a granulometric fraction of less than 20 micrometers or even less than 10 micrometers.

The advantage of at least partial use of very small particles is multiple. For example, the formation of these particles is normally performed by grinding small pieces of glass. In this operation, particles of relatively varied dimensions are formed. Even if an effort is made to limit the distribution range of the dimensions, it is not possible to completely eliminate the formation of very fine particles. Therefore, it is particularly desirable that the totality of the particles coming from the grinding be able to be heat treated to form hollow microspheres. This makes it possible to improve the overall yield in relation to the raw material: above all this makes it possible to avoid the particularly delicate sorting operations which are usually required to be performed either before or after expansion. Thus, the drawbacks linked to rejection of unusable by-products are also avoided by the present invention.

Another example of the advantage of being able to treat very fine particles resides in the characteristic qualities of the products obtained. The mode of treatment considered in our prior patent actually results, in the case of very fine particles, in microspheres of relatively high density and very small dimensions. These products are useful particularly as charges subjected to very high outside pressures. It should be noted that at constant density, the resistance to pressure increases when the size of the spheres decreases. Further, the fineness of the microspheres formed makes it possible, when they are introduced into a polymer molding compound, to achieve a smooth surface. It is also advantageous to be able to have microspheres which, simultaneously, exhibit very small dimensions and a slight density when the aim is the lightening of the weight of the materials in which these microspheres are incorporated. It seemed quite desirable to be able to perform the expansion of glass particles which for a very great proportion would correspond to these smallest granulometric fractions. Several difficulties opposed this type of operation. In practice it is not possible to obtain a product with very fine granulometry, for example, less than 25 micrometers, whose granulometric spectrum at the same time is very narrow, by the usual grinding means, such as roll mills and ball mills.

Another problem is due to the difficulties that can exist in extracting the powder from the mill. When the coarser particles tend to disappear, the formed powder agglomerates on the walls of the mill and the grinding balls.

More generally, even when by a sorting of the ground fractions a product is selected consisting in a relatively homogeneous way of very fine particles, serious handling difficulties are encountered. The powders consisting of these particles have a tendency to form aggregates from which it is difficult to detach the particles. These difficulties of individualizing of the particles appear in the transporting of them to the site where the expansion is to be performed. They also affect the quality of the products obtained, the treated particles in the form of aggregates tending to remain in contact with one another, which, on the one hand, does not enable them to be under the best conditions for their expansion and, on the other hand, promotes the "gluing" or "sticking" of the formed microspheres. This latter drawback is particularly bothersome when an effort is made to obtain microspheres of very small dimensions. It then becomes necessary to proceed to an additional granulometric separation and sorting step after the expansion of the microspheres.

The invention provides means for making it possible to produce microspheres from particles of very small dimensions, particularly less than 20 micrometers, for at least 90% by weight of these particles, and preferably less than about 10 micrometers.

The inventors have found that it is possible in a first stage to obtain the particles of very small dimensions indicated above by grinding of pieces of glass, and in a second stage to transform these particles into microspheres exhibiting the desired properties by adding to the glass a small amount of a fluidizing agent.

The fluidizing agents used should have a good affinity for glass. Consequently they exhibit a polar part comprising, for example, hydroxyl or amino radicals. They further advantageously exhibit a nonpolar part promoting the independence of the treated particles. As a general rule, they are products known for their surface active properties.

Although the exact mode of action of these agents is not well known, it can be assumed that there is formed on the surface of the particles a film of extreme fineness, practically monomolecular, which makes it possible to break the forces of attraction of the particles for one another. This would particularly explain that why the amount of agents used is always very small.

In proportion by weight, the fluidizing agent is always as low as possible. This proportion, independently of the exact nature of the agent chosen, does not exceed 0.5% by weight and preferably is not greater than 0.3%. The amount of agent introduced is a function of the dimension of the particles. It is clear that for the same mass of glass, the surface of the particles to be coated is greater the smaller the particles. Consequently, for very fine particles, the amount of fluidizing agent increases while remaining within the limits indicated above. It is also important not to use too great an amount of fluidizing agent. Beyond a certain threshold, probably corresponding to the uniform coating of the particles, addition of agent makes no further contribution and can even again reduce the fluidity of the mass.

Moreover, the fluidizing agent is advantageously in the liquid state, which facilitates its dispersion on the particles to be treated.

Typical fluidizing agents that can be used according to the invention are, for example, polyalkanolamines, monopropylene glycol or similar compounds.

These agents are preferably added at the time of the grinding operation. This way of proceeding not only facilitates a good distribution on the particles being formed but also makes it possible to avoid the drawbacks indicated above and which can appear starting from this stage. In particular, obtaining of very fine particles and in large proportion is promoted: agglomeration of the particles formed on the mill walls is avoided.

Addition of the fluidizing agent can be performed once or several times. It seems preferable to proceed to an addition several times during grinding to obtain a maximum degree of effectiveness for as small an amount of agent as possible.

Besides the use of the fluidizing agent, the inventors have been led to modify, for treatment of the smallest particles, certain elements of the process or device proposed in said prior patent. It particularly means taking into account the fact that the heat exchange between the particles and surrounding atmosphere takes place much faster with very small particles. For this reason, for example, the holding time in the flame can advantageously be shorter. Also, if necessary, the exact heat treatment temperature can be slightly lower (while, of course, remaining greater than the melting temperature of the glass). These two possibilities and optionally their combination are very appreciable. They make it possible to precisely control the process of expansion of the microspheres by shortening the period during which the expanded microspheres can be subjected to a collapse. The importance of this advantage will be illustrated below in the description of the apparatus.

To a certain extent, also considering the above indications relative to the length of the process, it is preferable to obtain very small microspheres of slight or low density from glasses having a predetermined sulfur content. By way of indication, the sulfur content by weight of the glass of the treated particles can be about 0.5% or even slightly more. To facilitate the transformation of the particles into microspheres, it can also be advantageous to incorporate into the composition an amount of boron that is relatively larger than in the most common glasses. Thus, it is possible to choose compositions containing from about one to 15% and preferably from about 5 to 15% by weight of boron oxide. It should be stressed that a very large part of this oxide is eliminated during the expansion treatment, so that the final hollow glass microspheres have a low $B_2O_3$ content on the order of between 1 and 3% by weight.

Moreover, the glasses used are relatively rich in alkali metals and particularly sodium, but at the temperatures chosen, this element is relatively volatile. The sodium content of the final microspheres therefore is much more limited than that of the initial particles. This constitutes an advantage of the technique according to the invention, which makes it possible to work at temperatures greater than those of the prior arts. The elimination of a considerable part of the sodium actually reduces the sensitivity of the microspheres to moisture and consequently improves the mechanical properties.

Under said conditions which will be made more precise in the examples, it is possible, thanks to the invention, to obtain microspheres both very small and with slight density, particularly microspheres whose grain size distribution average is at most equal to 20–25 micrometers or even less than 10 micrometers for a real density less than 0.5 $g/cm^3$.

BRIEF DESCRIPTION OF THE DRAWINGS

A better understanding of the invention can be had by now referring to the accompanying drawing figures, in which:

The device for producing microspheres, shown in FIG. 3, comprises the following elements: a fluidizing device 1 for suspending particles in a gas current and for transporting the particles to a burner 2 for combustion, a combustion chamber 3 which initiates combustion and then to a tempering enclosure 4 which completes the combustion of the particles. This part of the installation, in which the treatment leading to the expansion of the microspheres is performed, is followed by a series of elements whose role is to separate the formed spheres, on the one hand, from the gases that entrain them and, on the other hand, from the dust or unexpanded particles, or also from aggregates of particles. glued to one another. In FIG. 1, the set of elements for recovery of the microspheres comprises a preselector 10, two cyclones 5 and 6 and a sleeve filter 7.

This apparatus is slightly modified from that disclosed in our prior patent which also forms part of this invention.

Since the feeding of particles should be done in a uniform and continuous way in a gaseous reaction medium, a preferred method consists in entraining the particles with a gas current. The suspension of particles in a gas current is performed in a known way, for example, from a fluidized bed of particles.

The glass particles are introduced into the burner flame under conditions that can be those described in our prior patent or under slightly modified conditions. To these two modes correspond the two types of installations represented in FIGS. I and 2.

Figure 2:
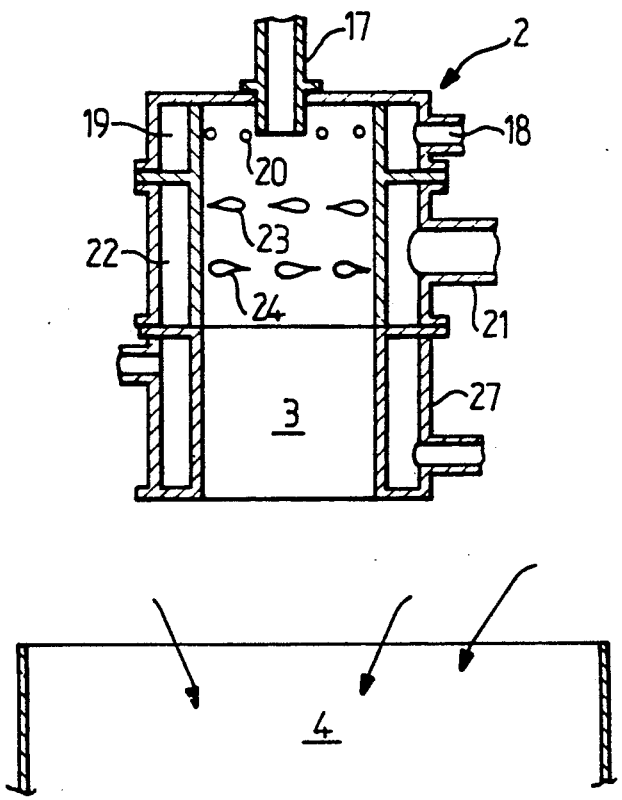
FIG. 2 represents a variation of the chamber of FIG. 1.
Figure 3:
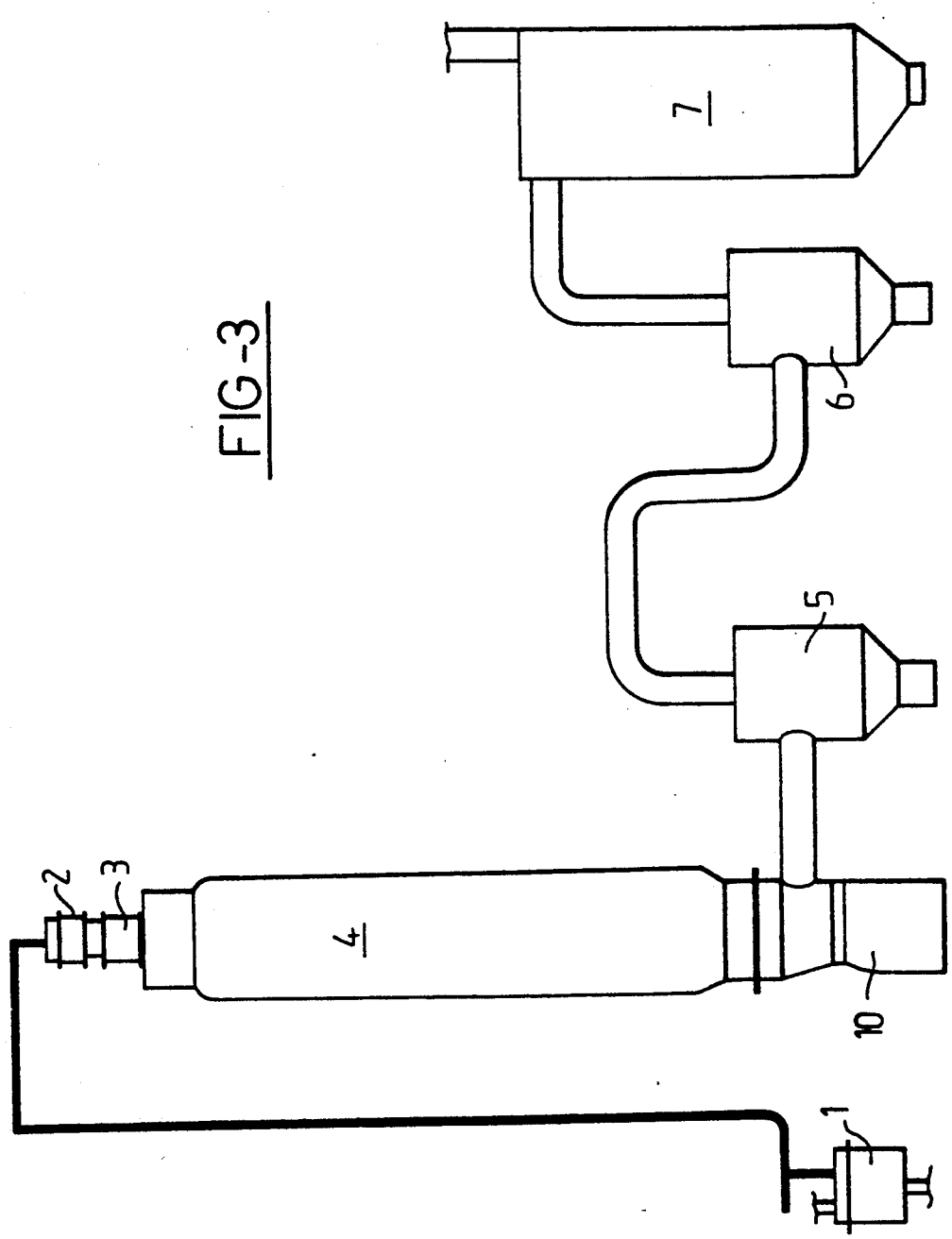
FIG. 3 is a flow diagram of a complete installation for forming microspheres according to the invention.

In the configuration of FIG. 2, the gas current carrying the particles is introduced axially by pipe 17 into burner 2.

The feeding of fuel gas is performed through a plurality of orifices 20 communicating with annular chamber 19. Chamber 19 itself is fed by line 18. The air is brought by pipe 21 into an annular chamber 22 and then enters the combustion zone by two series of orifices 23 and 24. These latter orifices are oriented so as to impart rotational movement of the air in opposite directions. The burner 2 is extended by a combustion chamber 3, delimited by a double metal wall 27, in which a cooling liquid circulates. In relation to the unit described in our prior patent, combustion chamber 3 is shorter to take into account the kinetics of expansion of very small particles. The holding of the particles at high temperature is thus reduced. Immediately after the combustion chamber, the particles and combustion gases are directed to cylindrical enclosure 4 which is open to the surrounding atmosphere. Passage from combustion chamber 3 to enclosure 4 is accompanied by a very large input of ambient air which makes possible to achieve a very sudden temperature drop. The air-combustion gas mixture is brought in a fraction of a second from the flame temperature to a temperature less than that of the softening of the glass. The expanded particles are then solidified.

In relation to the characteristics of the apparatus described in our prior patent, the combustion chamber is shorter to reduce the holding time of the particles at the highest treatment temperatures. The length of the chamber and consequently this holding can, for example, be limited to less than half of what they were in the prior configuration.

The arrangement of FIG. 2 is well suited to treat particles with diameters of about ten micrometers. The treatment time could be shortened even more for the smallest particles (i.e., those on the order of 1 to 10 micrometers. For this, a configuration of the type of that shown in FIG. 1 can be used. In this configuration, the combustion chamber which extends the burner is delimited by a refractory element 25 jacketed by a metal wall 26. Introduction of the particles by means of the carrier gas is performed by means of one or more ports 30, 31 constituted by the ends of the pipes carrying the particles. These ports are located immediately below the combustion chamber and are oriented so as to direct the particles toward the heart of the combustion gas flow. Two symmetrical ports are shown in FIG. 2. It is possible to have a single port or, on the other hand, more than two.

It is remarkable, as the inventors have found, to achieve a satisfactory expansion when the particles are put in contact with the combustion gas only at the actual moment they are going to be mixed with the ambient air. This demonstrates the rapidity of the phenomenon that leads particles to microspheres, especially since the transformation yields for the smallest particles are not less than those observed with a more extended treatment and are usually better.

Figure 1:
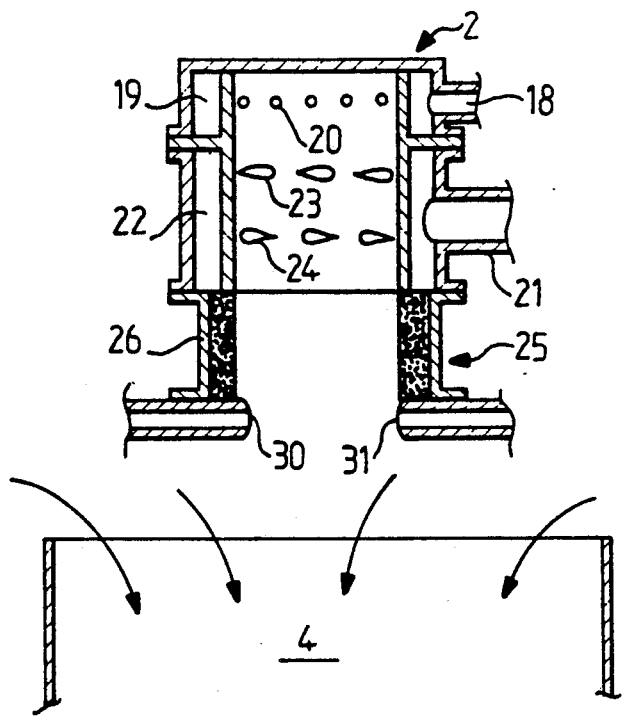
FIG. 1 represents, partially in cross-section, a chamber according to the invention in which the expansion of the particles is performed.

Another advantage of the arrangement of FIG. 1 is the avoidance of any contact of the particles with the walls at the moment when they would be able to adhere to it. The entire expansion and cooling process is performed in an unconfined space. When the particles penetrate into enclosure 4, the microspheres are sufficiently cooled so as to not be fixed to the walls.

Also, introduction of particles into the combustion chamber makes it possible to save cooling of the walls of this chamber, and the replacement of a double wall having water circulation, with a refractory wall. Moreover, use of the refractory wall makes it possible to keep the gases circulating in the combustion chamber at the highest temperatures.

When very small particles are treated, it is also necessary to use particularly adapted recovery means. In particular, cyclones are used whose characteristics lend themselves to the separation of very fine elements. There are, for example, cyclones whose conical part is relatively elongated in relation to the cylindrical part to promote settling of the particles.

In a first series of tests, the glass used exhibited the following composition by weight:

| | |
|---|---|
| $SiO_2$ | 68% |
| $Al_2O_3$ | 0.07% |
| CaO | 6.8% |
| MgO | 0.4% |
| $Na_2O$ | 13.85% |
| $B_2O_3$ | 5.9% |
| $SO_3$ | 0.77% |
| ZnO | 0.95% |
| $P_2O_5$ | 2.5% |

Various granulometric fractions were prepared from this glass.

The pieces of glass were introduced into a ball mill with 1 $cm^3$ of an agent consisting of a mixture of alkanolamines, particularly mono- and tri-ethanolamine (marketed under the name CLOTER C. 823 by the SODECIM company), at a rate of 1 $cm^3$ per kilogram of glass.

The product was ground until the desired granulometry was obtained. Optionally the ground material can be sorted by granulometric category by traditional means. The formed powder actually pours well and does not form agglomerates. It is possible particularly to perform a sorting in a dynamic selector.

The particles thus formed are treated in the way described in our previous patent. The powder put in suspension in a compressed air current is brought into a reactor consisting of a gas burner of the type represented in FIG. 2, in whose flame the particles pass very rapidly. The conditions in the burner are: a high temperature (greater than the melting temperature of the glass) and a slightly reducing atmosphere. Immediately after their passage in the flame, the formed microspheres are solidified by a sudden cooling obtained by a massive introduction of air at ambient temperature. The microspheres produced are recovered and separated from the unexpanded particles by traditional separation means such as cyclones or flotation.

The separated granulometric fractions correspond to the following dimensions in micrometers of particles:
a) 11–35
b) 13.5–30
c) 6.3–15.5
d) less than 7.

The interval defined between the two extreme values covers a proportion by weight of 80% of the particles. In other words, for each class no more than 10% at most of the particles are finer than the small dimensions and no more than 10% are larger than the upper limit indicated. Also, these narrow, defined intervals are directly obtained by utilizing the process and apparatus of the invention.

The table below summarizes the treatment conditions in each case and the results relating to the microspheres produced.

| particle dimensions | 11–35 | 13.5–30 | 6.5–15.5 | below 7 |

| -continued | | | | |
|---|---|---|---|---|
| feed kg/h | 6.8 | 5.5 | 5.5 | 4.5 |
| gas delivery m³/h | 12.8 | 11.5 | 14.5 | — |
| air delivery m³/h | 130 | 108 | 109 | — |
| flame temperature °C. | 1580 | 1580 | 1590 | 1580 |
| proportion of floating microspheres | 63% | 64% | 68.5% | 65% |
| dimensions of microspheres | 30–80 | 32–75 | 17–42 | 8–35 |
| real density of microspheres g/cm³ | 0.24 | 0.20 | 0.27 | 0.4 |

The indications relative to the microspheres concern only those that have been actually expanded. The proportion of unexpanded particles, however, remains relatively small. These unexpanded particles which do not float on the surface of the water can be separated by a flotation technique. This separation for a certain number of applications is not necessary, considering the small proportion of unexpanded spheres. This is particularly the case for the application as filler for molded plastics.

The results appearing in this table show that by operating with the particles, even if of extremely small dimensions and under conditions practically identical with those used for coarser particles, it is possible, to produce industrially in an acceptable way particularly in regard to the outputs and yields, microspheres of very small diameter (less than 50 micrometers) and having a relatively high real density (0.4 g/cm³).

It will be noted that the yield is expressed in relation to the mass of treated particles and that it concerns only floating microspheres to the exclusion of unexpanded particles, the separation being performed by flotation.

It also is remarkable that, in the technique described it is possible to treat an output as high as 4.5 kg/h of glass with particles the coarsest of which do not exceed 7 micrometers. It might have been feared that actually for particles so fine, the flame would go out. The output in the case of the smallest particles is slightly reduced but remains of an order of magnitude comparable with that of particles of larger batches.

The dimensions attained in particular with the two smallest granulometric fractions make it possible to attain dimensions of microspheres compatible with their use as filler in polymer molding techniques.

Moreover, for fraction d) an effort was made in the example given to obtain microspheres with a relatively high density. If a slighter density is desired, it is advisable, for example, to reduce the particle feed delivery. Of course, the reduction of the density of the microspheres is accompanied by a corresponding increase in their dimensions. Still if it is desired to maintain the very small dimensions obtained in d), then it is advisable to start from a fraction of particles with still smaller dimensions, limited, for example, to about 5 micrometers. Tests run under these conditions showed the feasibility of the operation although yields are slightly reduced.

The preceding results were confirmed in a considerable number of tests run on a device comprising a combustion chamber of the type represented in FIG. 1. These tests were concentrated particularly on the smallest particles. The results are presented below in the same way as in the preceding table.

In this table, the dimensions of the particles and of the microspheres obtained are defined, on the one hand, by the preceding limits in which 80% of the sample are found and by the average dimension $D_{50}$ on both sides of which is located 50% of this sample.

| particle dimensions | 2.8–11 | 2.6–12 | 2.6–12 | 2.6–12 | 2.6–12 |
|---|---|---|---|---|---|
| particle dim. $D_{50}$ | 6.4 | 6.5 | 6.5 | 6.5 | 6.5 |
| feed kg/h | 6.4 | 5 | 6.75 | 6 | 6 |
| gas flow m³/h | 14.4 | 15 | 13.8 | 15 | 13 |
| air flow m³/h | 120 | 88 | 150 | 120 | 125 |
| flame temperature °C. | 1600 | 1560 | 1450 | 1580 | 1580 |
| proportion of floating microspheres | 80% | — | — | — | 75% |
| dimensions of microspheres | 4.2–16.9 | 4.1–25.6 | 4–27 | 4.6–24.7 | 6.5–29 |
| $D_{50}$ | 9.5 | 12.8 | 13.4 | 13 | 16 |
| real density of microspheres g/cm³ | 0.45 | 0.56 | 0.54 | 0.59 | 0.48 |

These results bring out the possibility of working with a relatively large feed (about 6 kg/h) despite the smallness of the particles. They also show a very satisfactory yield. They also show that it is possible to treat smaller particles at lower temperatures.

Other tests were run to prepare still smaller microspheres and exhibiting a slighter density. These tests were run with glass richer in sulfur an boron oxide. Its composition was the following:

| $SiO_2$ | 63.30% | $B_2O_3$ | 11% |
|---|---|---|---|
| CaO | 6.8% | $SO_3$ | 1.2% |
| MgO | 0.2% | ZnO | 1% |
| $Na_2O$ | 14% | $P_2O_5$ | 2.5% |

It should be recalled that the above-stated composition is of the glass particles before heat treatment. The composition of the produced microspheres is notably different with regard to the most volatile elements, particularly sulfur, boron and sodium. By way of indication, the final level of boron was about 2.3%.

The results of tests run with this glass are given in the following table:

| particles dimensions | 2.4–8 | 2.6–10.8 | 1.8–6.1 |
|---|---|---|---|
| particles dim. $D_{50}$ | 4 | 5.9 | 3.6 |
| feed kg/h | 4.5 | 4.5 | 7.5 |
| gas flow m³/h | 15 | 14.8 | 15 |
| air flow m³/h | 111 | 120 | 128 |
| flame temperature °C. | 1600 | 1600 | 1600 |
| proportion of floating microspheres | — | — | 80% |
| dimensions of microspheres | 4.1–14.5 | 6.6–28.5 | 3.8–18 |
| $D_{50}$ | 8.8 | 16 | 8.5 |
| real density of microspheres g/cm³ | 0.62 | 0.30 | 0.5 |

The preceding results show the aptitude of the technique for treating grain size fractions going down below 2 micrometers with a relatively large flow and satisfactory yields. Slight microsphere dimensions were also attained (second column, the average being around 16 micrometers) with a very slight density. Smaller dimensions from grain size fractions of the same nature can be obtained (column 3, average 8.5 micrometers) with a lighter expansion which is reflected by a slightly greater density.

Obtaining of still smaller microspheres is achieved starting from a smaller grain size which alone allows the use of the fluidizing agents described above.

Other fluidizing agents were successfully tried, particularly the products marketed by the SODECIM company under the name CLOTER B, CLOTER A and CLOTER F 992.

Conversely, it became clear from experience that some fluidizing agents of pulverulent materials were ineffective in the techniques according to the invention. This in particular is the case of silica base powders marketed under the name of Aerosil A 380. Use of these products even in proportions notably higher than those indicated above (on the order of 1% by weight) did not allow the treatment of fine glass particles. The particles agglomerated as in the absence of these agents.

Generally to determine whether a known fluidizing agent can or cannot be used according to the invention, very simple tests can be used. The agent in question is mixed with the particles to be treated in a proportion of 0.1%. The resulting mixture is placed in a container whose lower part is conically shaped, the walls of the cone being inclined at 45°. An opening at the vertex of the cone makes possible the flow of the powder. When the powder does not agglomerate, the agent is suitable. This test also makes it possible to compare the effectiveness of agents among themselves according to the flow rate of the powder through the cone.

While it is apparent that the invention herein disclosed is well calculated to fulfill the objects above stated, it will be appreciated that numerous modifications and embodiments may be devised by those skilled in the art, and it is intended that the appended claims cover all such modifications and embodiments as fall within the true spirit and scope of the present invention.

What is claimed is:

1. An apparatus for the production of hollow microspheres from glass particles, comprising:
   a) means for suspending glass particles in a gas current;
   b) combustion chamber means having a reducing atmosphere for heating said particles and forming hollow glass microspheres therefrom;
   c) tempering and cooling means, immediately following the combustion chamber means and open to the surrounding atmosphere for allowing ambient air to mix with the hollow microspheres; and
   d) separation means to collect the hollow microspheres.

2. The apparatus of claim 1, in which the combustion chamber means is delimited by a refractory wall and introduction of the particles is performed with the carrier gas at the output of the combustion chamber.

3. The apparatus of claim 2, further including one or more ports for feeding particles, wherein said ports are oriented toward the heart of the combustion gas flow.

4. The apparatus of claim 1, in which the separation means comprises at least one cyclone whose conical part is at least as long as the cylindrical part.

5. An apparatus for the production of hollow microspheres from glass particles, comprising:
   a) means for suspending particles in a gas current;
   b) means for directing said suspended particles to burner means;
   c) burner means for heating said particles and forming hollow microspheres therefrom, comprising combustion chamber means having a reducing atmosphere for introduction of the particles into the burner means and located so that the particles penetrate into the combustion gases to form a mixture, the movement of said mixture is being in the direction of advance of the gases;
   d) tempering and cooling means immediately following the burner means and open to the surrounding atmosphere for allowing ambient air to mix with the microspheres under the action of suction maintained from the end of separation means; and
   e) separation means to collect the particles transported by the gases before the rejection of the latter.

6. An apparatus for producing hollow microspheres from particles of a soda-lime-silica glass containing slight amounts of sulphur compounds or $B_2O_3$, comprising:
   a) means for suspending such particles in a gaseous current;
   b) burner means;
   c) means for introducing such suspended particles into said burner means for movement therein in a predetermined direction;
   d) means for introducing combustion gases into said burner means for movement therein in said predetermined direction;
   e) means for producing combustion in a reducing atmosphere at substantially at least about 1550° C.; and
   f) cooling means open to the surrounding atmosphere.

7. The apparatus of claim 6, further comprising tempering means, for receiving such gases and particles from said burner means and for admitting ambient air to cool such gases and particles; separating means communicating with said tempering means for separating such particles from such gases; and suction means communication with said separating means for drawing such ambient air into said tempering means and for drawing such ambient air, gases and particles into said separating means.

8. The apparatus of claim 7, wherein said burner means is positioned above said tempering means and said predetermined direction of movement is downward.

9. The apparatus of claim 7, wherein said burner means has a combustion zone in which said combustion takes place, said combustion zone having approximately the same cross-sectional diameter over its entire length.

10. The apparatus of claim 9, wherein the length of said combustion zone is selected as a function of the flow rate of such gases and particles such that the latter flow through said zone in no more than an average of about 0.1 second.

11. The apparatus of claim 10, wherein the length of said combustion zone is about 6–50 cm.

12. The apparatus of claim 10, wherein the length of said combustion zone is about 10–25 cm.

13. The apparatus of claim 7, wherein at least part of said burner means adjacent to said tempering means includes cooling means.

14. The apparatus of claim 13, wherein said cooling means has a double wall for circulating a cooling fluid to cool said part of said burner means to below about 150° C.

15. The apparatus of claim 5, wherein said combustion gases include a fuel and an oxidant, said apparatus further including at least two locations for introducing said oxidant into said burner means, at least one of said locations being downstream, with respect to said predetermined direction, of the point of introduction of said fuel, and also downstream of the point of introduction of said particles.

* * * * *